(12) United States Patent
Frisch

(10) Patent No.: US 9,758,350 B2
(45) Date of Patent: Sep. 12, 2017

(54) ELEVATOR PAD HANGING APPARATUS AND METHOD

(71) Applicant: Harry Miller Co., Inc., Boston, MA (US)

(72) Inventor: Michael Frisch, Braintree, MA (US)

(73) Assignee: Harry Miller Co., Inc., Boston, MA (US)

( * ) Notice: Subject to any disclaimer, the term of this patent is extended or adjusted under 35 U.S.C. 154(b) by 0 days.

(21) Appl. No.: 14/964,447

(22) Filed: Dec. 9, 2015

(65) Prior Publication Data

US 2016/0090273 A1 Mar. 31, 2016

Related U.S. Application Data

(62) Division of application No. 13/801,642, filed on Mar. 13, 2013, now abandoned.

(51) Int. Cl.
*B66B 11/02* (2006.01)
*F16M 13/02* (2006.01)

(52) U.S. Cl.
CPC ...... *B66B 11/0246* (2013.01); *B66B 11/0226* (2013.01); *F16M 13/02* (2013.01); *B66B 11/0253* (2013.01); *Y10T 29/49629* (2015.01)

(58) Field of Classification Search
CPC ............. B66B 11/0246; B66B 11/0226; Y10T 29/49629
USPC ................................................ 248/201, 317
See application file for complete search history.

(56) References Cited

U.S. PATENT DOCUMENTS

| | | | | |
|---|---|---|---|---|
| 2,840,155 A | * | 6/1958 | Stern | A47H 13/00 16/87.2 |
| 3,115,804 A | * | 12/1963 | Johnson | F16B 21/086 411/338 |
| 3,702,087 A | * | 11/1972 | Schmitt | F16B 19/1027 411/339 |
| 3,894,754 A | * | 7/1975 | Staats | B42D 17/00 248/222.41 |
| 4,033,243 A | * | 7/1977 | Kirrish | F16B 37/145 411/338 |
| 4,089,129 A | * | 5/1978 | Patterson, Jr. | G09F 7/22 248/317 |
| 4,266,677 A | * | 5/1981 | Dewsnap | A47F 5/0006 211/113 |
| 4,459,521 A | * | 7/1984 | Barge | E05F 15/695 318/267 |
| 4,490,083 A | * | 12/1984 | Rebish | F16B 5/02 411/338 |

(Continued)

*Primary Examiner* — Nkeisha Smith
(74) *Attorney, Agent, or Firm* — Lowe Graham Jones PLLC (57) ABSTRACT

A system for protecting an elevator including a plurality of wall panels. The system includes a first plurality of hangers each having a suspension portion and a hanger portion. A protective sheet having a plurality of holes along an edge thereof is fastened to the suspension portions by a plurality of snap fasteners inserted through both the aperture of a hanger and a hole of the plurality of holes. The hanger portion engages an upper edge portion of a wall panel of the plurality of wall panels. In some uses, the protective sheet is positioned between the suspension portion and the wall panel of the plurality of wall panels. The hanger portion may be embodied as a hook and the snap fasteners may be embodied as plastic rivets.

7 Claims, 7 Drawing Sheets

(56) References Cited

U.S. PATENT DOCUMENTS

| | | | | |
|---|---|---|---|---|
| 4,646,997 A * | 3/1987 | Fadley | G09F 7/20 | 248/201 |
| 4,708,222 A * | 11/1987 | Bills | B66B 11/0226 | 160/135 |
| 4,728,238 A * | 3/1988 | Chisholm | F16B 19/004 | 411/456 |
| 4,924,973 A * | 5/1990 | Miller | B66B 11/0226 | 160/368.1 |
| 4,983,047 A * | 1/1991 | Netto | B65D 27/30 | 24/30.5 R |
| 5,143,500 A * | 9/1992 | Schuring | F16B 19/1027 | 16/38 |
| 5,738,159 A * | 4/1998 | O'Brien | A47H 23/04 | 160/124 |
| 6,223,914 B1 * | 5/2001 | Snell | A47G 25/06 | 211/117 |
| 6,446,932 B1 * | 9/2002 | Butterfield | A47F 5/0006 | 211/50 |
| 7,021,001 B1 * | 4/2006 | Schooler | E05F 15/41 | 318/282 |
| 7,040,582 B2 * | 5/2006 | Rosler | B65D 33/14 | 248/101 |
| 7,086,635 B1 * | 8/2006 | Drapeau | A47F 5/0006 | 206/480 |
| 7,563,063 B1 * | 7/2009 | Madej | F16B 19/08 | 411/339 |
| 8,136,209 B1 * | 3/2012 | Willison | G09F 17/00 | 16/430 |
| 8,286,310 B1 * | 10/2012 | Negron | B66B 11/0226 | 16/87 R |
| 8,468,767 B1 * | 6/2013 | McBride | E04B 1/40 | 52/461 |
| 8,608,239 B1 * | 12/2013 | Lawson | B60P 3/36 | 296/208 |
| 9,234,979 B2 * | 1/2016 | Bolbocianu | G01V 3/02 | |
| 2002/0153463 A1 * | 10/2002 | Muller | A47H 15/00 | 248/317 |
| 2003/0011229 A1 * | 1/2003 | Bell | A61G 5/1059 | 297/344.17 |
| 2006/0006823 A1 * | 1/2006 | Ferretti | E05F 15/695 | 318/280 |
| 2010/0050787 A1 * | 3/2010 | Abert | H03K 17/955 | 73/862.626 |
| 2011/0271571 A1 * | 11/2011 | Lennard | G09F 7/18 | 40/606.01 |
| 2012/0085759 A1 * | 4/2012 | Sabounjian | A47G 25/005 | 220/9.2 |
| 2013/0270409 A1 * | 10/2013 | Osorio | A45C 13/30 | 248/340 |
| 2014/0138508 A1 * | 5/2014 | Margulis | D06F 57/12 | 248/317 |
| 2014/0255639 A1 * | 9/2014 | Miller | A47H 1/18 | 428/58 |

\* cited by examiner

Fig. 6B

ELEVATOR PAD HANGING APPARATUS AND METHOD

CROSS REFERENCE TO RELATED APPLICATIONS

This application is a divisional of U.S. patent application Ser. No. 13/801,642 filed Mar. 13, 2013, the contents of which are herein incorporated in its entirety.

FIELD OF THE INVENTION

This application relates to apparatuses and methods for protecting interior surfaces of an elevator.

BACKGROUND OF THE INVENTION

In many office and apartment buildings, a freight elevator does not exist. In such buildings, those moving large items in and out of the building must use the usual passenger elevators. In many buildings, passenger elevators are finished with decorative panels that are made of wood, fabric, metal, or other material that could be scratched or otherwise marred when moving large items or large quantities of items. It is a common practice to suspend pads over the panels in such elevators to protect against damage. Pads may also be used during servicing of the elevator. Typically, specialized pads for use in elevators are required to properly protect the panels.

The systems and methods disclosed herein provide an improved and versatile means for suspending pads in an elevator.

SUMMARY OF THE INVENTION

In one aspect of the invention, a system for protecting an elevator includes a plurality of wall panels. The system includes a first plurality of hangers, each having a suspension portion and a hanger portion, the suspension portion defining an aperture. A protective sheet having a plurality of holes along an edge thereof is used with the plurality of hangers. A plurality of snap fasteners secure the protective sheet to the plurality of hangers. In use, each snap fastener is inserted through both the aperture of a hanger and a hole of the protective sheet, such that the hanger portion and protective sheet are captured between a pair of opposing heads of the each snap fastener. The hanger portion engages an upper edge portion of a wall panel. In some uses, the protective sheet is positioned between the suspension portion and the wall panel of the plurality of wall panels.

In another aspect of the invention, the hanger portions each comprise a hook engagable with the upper edge portion of the wall panel. The hook includes a horizontal portion perpendicular to the suspension portion and a vertical portion secured to the horizontal portion and extending downwardly therefrom. The upper edge portion of the wall panel is positioned between the vertical portion and the suspension portion.

In other embodiments, the hanger portions each define an aperture having a first opening and a slot extending upwardly from the first opening and having a width smaller than that of the first opening. The elevator interior further includes a plurality of posts having post heads secured to a distal end thereof, the post heading being sized to fit through the aperture but not the slot and the post being sized to fit within the slot.

The hangers of the present invention are easy to secure to elevator pads and convenient to use for hanging protective pads within elevator interiors.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
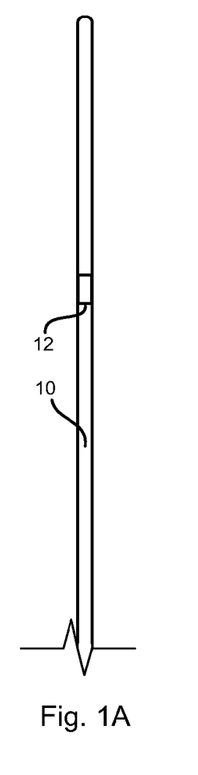
FIGS. 1A-1C are side elevation views of a protective sheet mounting system in accordance with an embodiment of the present invention.
Figure 1B:
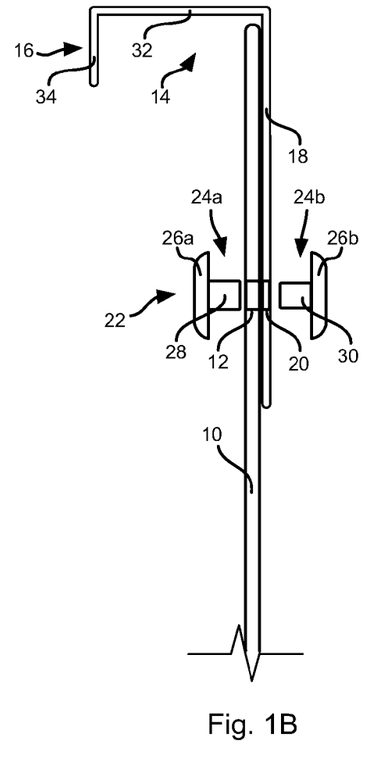
Figure 1C:
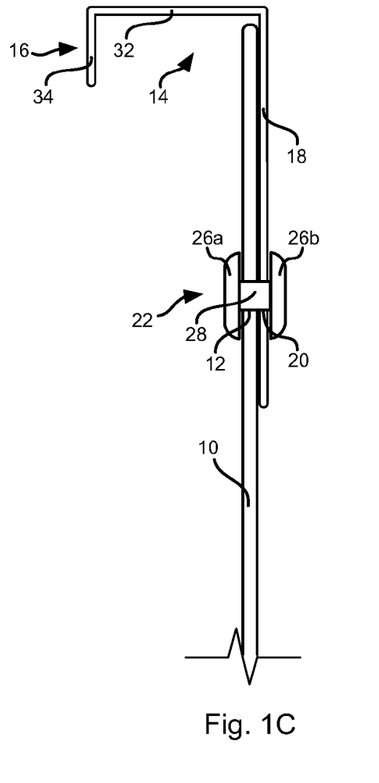

Referring to FIGS. 1A through 1C, in accordance with an embodiment of the invention, a protective pad 10 may be suspended in an elevator using the illustrated installation method and apparatus. The protective pad 10 may be any sheet of material that is capable of preventing some form of damage to the interior of an elevator. The protective pad 10 may have a shape that generally corresponds to the shape and size of a wall or wall panel of an elevator, or multiple walls or wall panels of an elevator. For example, the protective pad 10 may be a rectangle having a width within plus or minus ten, preferably five, percent of a width of a wall of the elevator and a height at least as great as a height of decorative panels or finished surfaces of the elevator. Alternatively, the height may be within plus or minus ten, preferably five, percent of a height of a wall or wall panel of an elevator. A protective pad 10 may also be a rectangle that may be completely doubled over, partially folded over onto itself, or folded multiple times to achieve the above referenced dimensions relative to a target elevator.

For example, a simple sheet of fabric or plastic may be sufficient to prevent some scratches. A thick pad of elastomeric material such as a foam rubber may be sufficient to prevent some scratches and dents. Likewise, a textile pad, such as a quilted pad, may also be suitable. As will be apparent from the following discussion, a protective sheet capable of preventing some damage need not be fabricated for use as an elevator pad. For example, simple matted moving blankets, blankets for use as bedding, or any other sheet of material, may be adapted for use as elevator pads using the apparatus and methods disclosed herein.

Referring to FIG. 1A, a protective pad 10 that is initially a continuous sheet of material or a sheet of material without appropriately placed holes may be cut, punched, or otherwise modified to form an aperture 12 therein. The aperture 12 may be a simple horizontal or vertical slit, puncture, circular cutout, or cutout of some other shape. In one mode of operation, a box cutter, knife, or any common cutting tool may be used to make the aperture 12. The illustrated aperture 12 may be one of a series of apertures along an edge of the protective pad 10 or otherwise distributed in a row in the protective pad 10. Where the protective pad 10 is folded to achieve a desire folded dimension, the aperture 12 or row of apertures 12 may be made after folding.

Referring to FIG. 1B, a portion of the protective pad 10, such as an edge portion, may be placed in engagement with a mounting system 14. For example, the mounting system 14 may include a hanging portion 16 that engages a wall or panel of an elevator and a suspension portion 18 that engages an upper edge portion of the protective pad 10. As is apparent in FIG. 1B, the hanging portion 16 may be embodied as a hook, such as by securing a horizontal portion 32 perpendicular to the suspension portion at a first edge of the horizontal portion 32 and securing a vertical portion 34 to an opposing edge of the horizontal portion 32, such that both the suspension portion 18 and vertical portion 34 extend in the same direction and are suitable for capturing a portion of a wall or wall panel of an elevator therebetween. Accordingly, a separation distance between the vertical portion 34 and the suspension portion 18 may be slightly larger, e.g., within five or ten percent, for example, of a width of the panel with which the mounting system 14 is used. Other forms and shapes of hooks may also be used.

The suspension portion 18, horizontal portion 32, and vertical portion 34 may be formed of a monolithic piece of material or secured to one another by means of welds, bolts, or any other fastening means. Some or all of the suspension portion 18, horizontal portion 32, and vertical portion 34 may be covered with a compliant or cushioning material or coating in order to prevent damage to an elevator wall or wall panel. In some embodiments, the inner surfaces of the suspension portion 18 and vertical portion 34 (those surfaces of the suspension portion 18 and vertical portion 34 facing one another) and a lower surface of the horizontal portion 32 may be coated with a compliant or cushioning material or have a pad or cushion secured thereto.

With the protective pad 10 facing, engaging, or otherwise adjacent, the suspension portion 18, the protective pad 10 may be fastened to the suspension portion 18. For example, the suspension portion 18 may include an aperture 12. A fastener 22 is passed through the apertures 12 and 20 and captures the suspension portion 18 and protective pad 10 therebetween. In the preferred embodiment, the fastener 22 is a snap rivet including a first portion 24a and a second portion 24b that engage one another in a removable or non-removable fashion. For example, the first and second portions 24a, 24b may include heads 26a, 26b that are sufficiently wide to capture a significant portion of the protective pad 10 and suspension portion 18 therebetween, as shown in FIG. 1C.

The manner in which the heads 26a, 26b secured to one another through the apertures 12, 20 may include any manner known in the art of plastic rivets. For example, one of the heads 26a may have a receiver 28 secured thereto, the receiver 28 having a smaller diameter than the head 26a and defining an aperture. The other head 26b may have an insertable portion 30 secured thereto. The insertable portion 30 is insertable in the receiver 28 and is retained in the receiver 30 by some means. For example, the insertable portion 30 may have a barb or lip that engages a groove, tab, shoulder, or other structure within the receiver 28 to hinder removal. In a like manner, the receiver 28 may have a barb or lip within a central aperture thereof that engages a groove, lip, or tab, encircling the insertable portion 30. Any other means of securing the insertable portion 30 and receiver 28 together as known in the art of plastic rivets may be used, including threaded engagement.

Figure 2A:
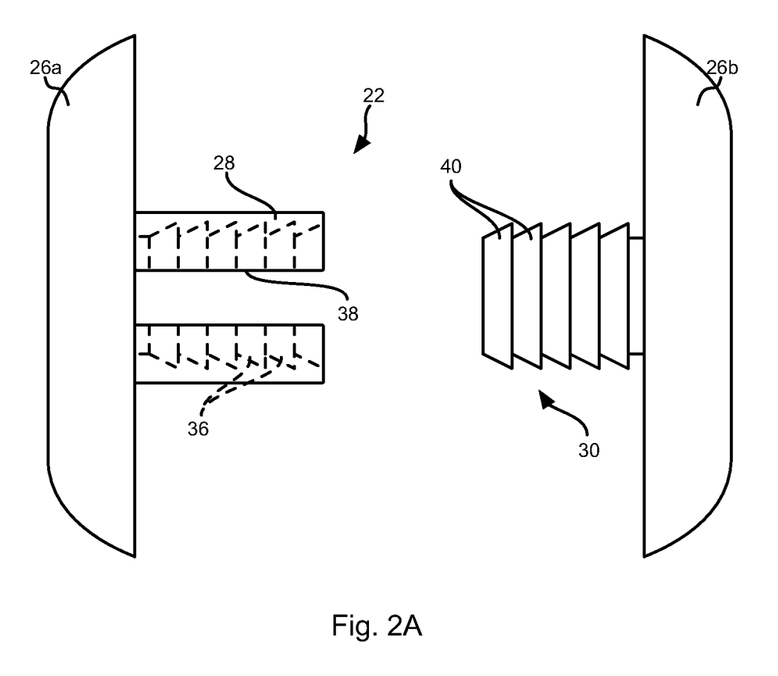
FIGS. 2A and 2B are side elevation views of a snap fastener suitable for use in accordance with an embodiment of the present invention.
Figure 2B:
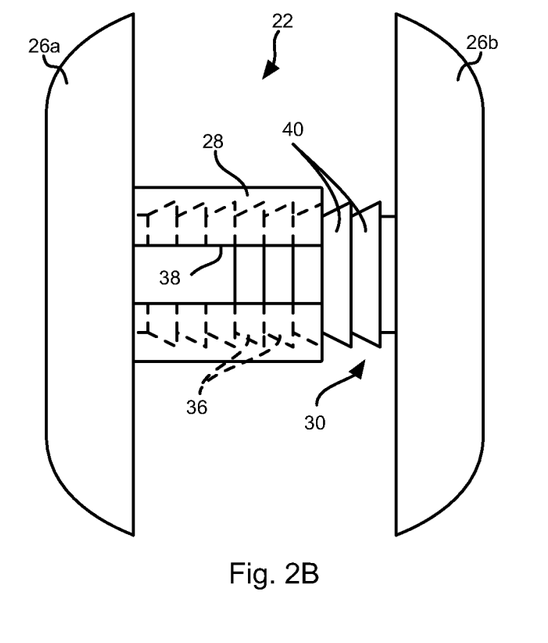

Referring to FIGS. 2A and 2B, in one exemplary embodiment, a fastener 22 may include the illustrated receiver 28 and insertable portion 30. As shown the receiver 28 includes a plurality of internal circumferential grooves 36. The receiver 28 may additionally include one or more slits 38 to facilitated compliant expansion of the receiver 28. In an alternative embodiment, the one or more slits 38 are instead defined in the insertable portion 30 to facilitate compliant compression of the insertable portion 30 during insertion. In yet another alternative embodiment, one or both of the receiver 28 and insertable portion 30 are sufficiently compliant to enable insertion without slits 38.

The insertable portion 30 may include a plurality of circumferential ridges 40 or barbs 40 that are sized to fit within the grooves 36. The pitch of the barbs 40 may be the same as the pitch of the grooves 36 such that the insertable portion 30 may be engaged at a variety of axial positions depending on a desired separation between the heads 26a, 26b. As is apparent in FIGS. 5A and 5B, the circumferential barbs 40 slope inward with distance toward the distal end of the insertable portion 30 such that the insertable portion 30 is more readily insertable than removable. The grooves 36 may be simple cylindrical grooves or may have a taper or slope corresponding to the barbs 40.

In use, the insertable portion 30 is urged into the receiver 28. The barbs 40 slightly deflect the walls of the receiver 28 facilitated by the one or more slits 38. The barbs 40 seat within the grooves 36 and the compliance of the receiver 28 urges the grooves 36 against the barbs 40. Due to the slope and orientation of the barbs 40, removal of the insertable portion 30 requires much more force than insertion and may even be impossible with out destroying the barbs 40 or walls of the receiver 28. In some embodiments, the barbs 40 and grooves 36 are helical in shape, i.e. define threads, such that disengagement of the barbs 40 and grooves 36 may be accomplished by relative rotation of the barbs 40 and grooves 36.

Figure 3:
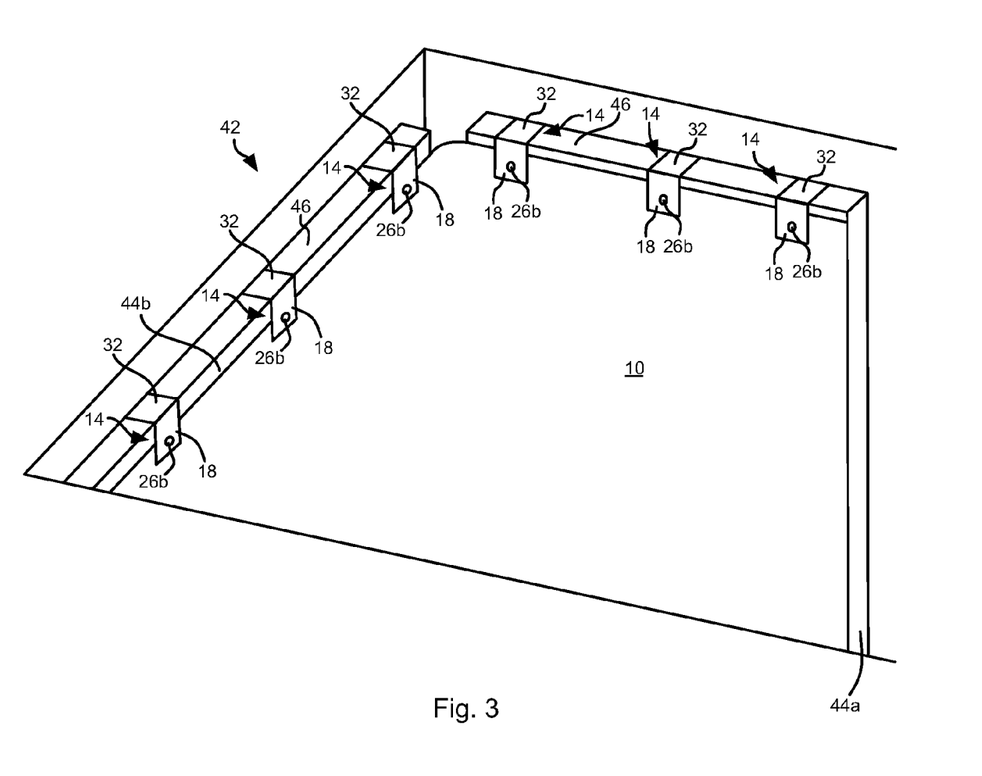
FIG. 3 is an isometric view of an elevator interior having a protective sheet mounting system in accordance with an embodiment of the present invention.

Referring to FIG. 3, the illustrated configuration of the mounting system 14 and protective pad 10 shown in FIG. 1A through 1C may be replicated for a number of apertures 12 formed in the protective pad 10 and the number of apertures 12 may be sufficient to retain the protective sheet with acceptable sagging between apertures 12. For example, as shown in FIG. 3, an elevator 42 may be protected by engaging a number of mounting systems 14 with one or more wall panels 44a, 44b having a protective pad 10 hanging therefrom in the manner shown in FIGS. 1A through 1C. As illustrated, the horizontal portion 32 engages the upper edge 46 of the wall panel 44a, 44b having an upper edge portion of the wall panel 44a, 44b captured between the vertical portion 34 (not shown) and the suspension portion 18. The pad 10 is oriented to cover the entirety, or substantially the entirety, of the wall panel 44a or wall panels 44a, 44b to be covered with the pad 10.

Figure 4A:
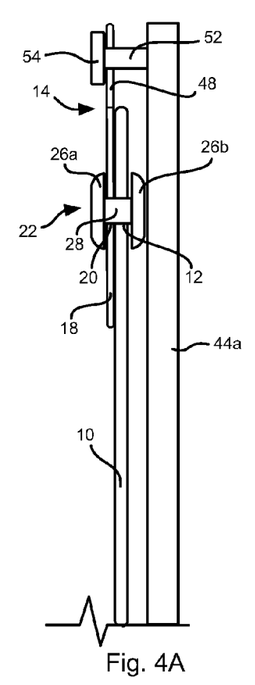
FIG. 4A is a side elevation view of an alternative protective sheet mounting system in accordance with an embodiment of the present invention.
Figure 4B:
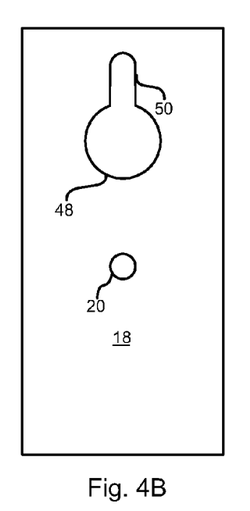
FIG. 4B is a front elevation view of an alternative protective sheet mount in accordance with an embodiment of the present invention.
Figure 4C:
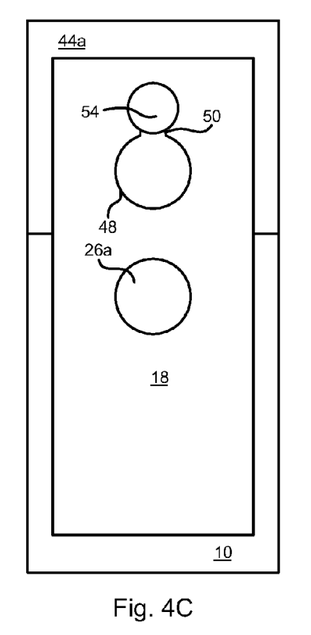
FIG. 4C is a front elevation view of the alternative protective sheet mounting system of FIG. 4A.
Figure 5:
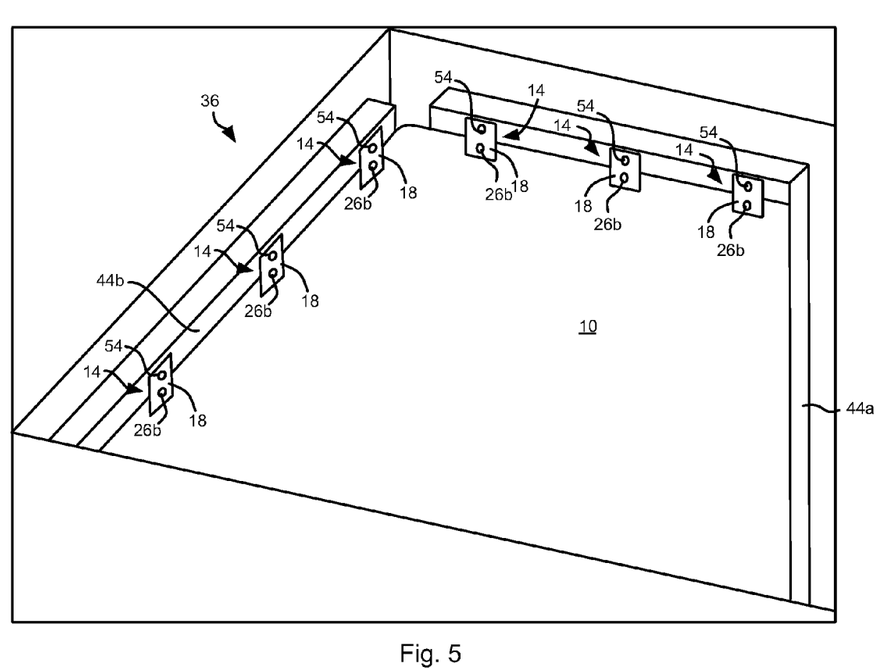
FIG. 5 is an isometric view of an elevator interior having the protective sheet mounting system of FIG. 4A.

Referring to FIGS. 4A through 4C, in some embodiments, elevators are equipped to facilitate hanging of padding therein. The embodiment illustrated in FIGS. 4A through 4C show a mounting system 14 that may be suitable for use in such elevators. In the illustrated embodiment, the suspension portion 18 defines an aperture 48 and a slot 50 extending therefrom. An elevator wall panel 44a or wall may have posts 52 extending outwardly therefrom and include a widened head portion 54 secured to a distal end thereof. As shown in FIG. 4C, in use, the aperture 48 is passed over the head portion 54 and the post 52 slides into the slot 50. The protective pad 10 may be secured to the suspension portion 18 in the same manner as for the embodiments of FIGS. 1A through 1C. Referring to FIG. 5, for each of a plurality of posts and corresponding post heads 54, a suspension portion 18 may be mounted thereon in the manner shown in FIG. 4C. The protective pad 10 may be secured to the suspension portion 18 before or after mounting of the suspension portion 18 to the wall panel 44a, or wall panels 44a, 44b.

Figure 6A:
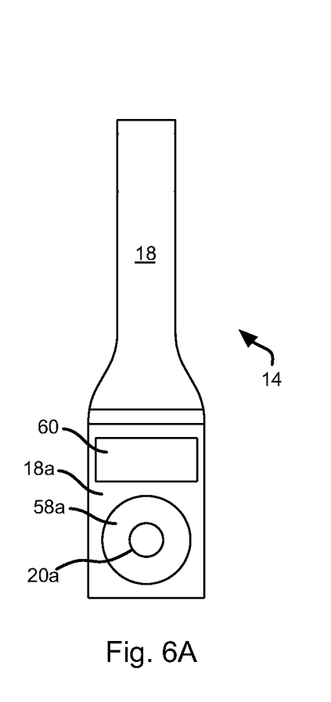
FIG. 6A is a front elevation view of another alternative protective sheet mounting system in accordance with an embodiment of the present invention.
Figure 6B:
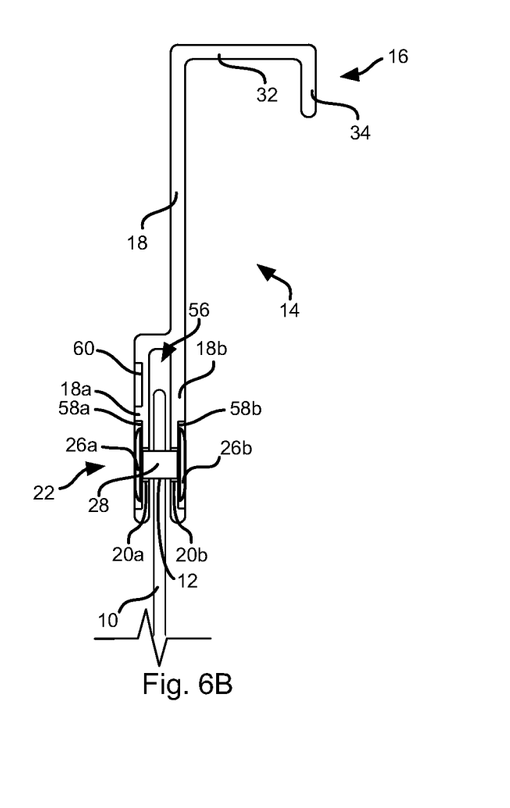
FIG. 6B is a side elevation view of the mounting system of FIG. 6A.

Referring to FIGS. 6A and 6B, in another alternative embodiment a suspension portion 18 may have a front portion 18a and a rear portion 18b secured thereto, such as at a lower end thereof. The front and rear portions 18a, 18b define a gap 56 therebetween such that protective pad 10 is insertable into the gap 56. For example an upper end of the portions 18a, 18b may secured to a lower end portion of the suspension portion 18 and lower ends of the portions 18a 18b may be free, thereby enabling insertion of the protective pad 10 into the gap 56.

The front and rear portions 18a, 18b may define apertures 20a, 20b, respectively, for receiving a fastener 22. In use, the receiver portion 28 and/or insertable portion 30 may pass through the aperture 20a, the aperture 12 in the protective pad 10, and the aperture 20b in order to secure the pad 10 to the mounting system 14. In the illustrated embodiment a front surface of the front portion 18a and a rear surface of the rear portion 18b define countersinks 58a, 58b around the apertures 20a, 20b, respectively, to receive the heads 26a, 26b of the fastener 22. In the illustrated embodiment, the depths of the countersinks 58a, 58b are such that the heads 26a, 26b do not protrude beyond the front and rear surfaces of the portions 18a, 18b, respectively. However, in other embodiments, this may not be true. The front portion 18a may additionally define a recess 60 for receiving a label, such as an adhesive label, to enable branding or labeling of the mounting system 14 with other information.

As is apparent in FIG. 6A, the front and rear portions 18a, 18b may be somewhat wider than the suspension portion 18, such as between 50 and 120 percent wider. The increased width of the front and rear portions 18a, 18b may provide area for defining the apertures 20a, 20b and provide sufficient material around the apertures 20a, 20b to support the stresses imposed by the fastener 22 inserted through the apertures 20a, 20b. As is apparent in FIG. 6B, the front portion 18a protrudes forwardly from the suspension portion 18 whereas the rear portion 18b has a rear surface that is flush with the rear surface of the suspension portion 18, thus enabling the pad 10 to hang flat along a wall panel to which it is mounted. The manner in which the mounting system of FIGS. 6A and 6B is used may be the same as for any of the embodiments disclosed herein. Likewise the hanger portion 16 shown in FIGS. 6A and 6B may be substituted with the aperture 48 and slot 50 of FIGS. 4A-4C.

While preferred embodiments of the invention have been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method for protecting an elevator having a plurality of wall panels, the method comprising:
   providing a first plurality of hangers, each having a suspension portion and a hanger portion, the suspension portion defining an aperture;
   providing a plurality of holes along an upper edge of a protective sheet;
   inserting a first snap fastener portion of a snap fastener through both a hole of the plurality of holes and the aperture of the suspension portion of a hanger of the first plurality of hangers;
   engaging a second snap fastener portion of the snap fastener effective to capture the protective sheet and suspension portion of the hanger between the first and second snap fastener portions; and
   engaging the hanger portion of the hanger with a wall panel of the plurality of wall panels;
   wherein engaging the hanger portion of the hanger with the wall panel further comprises engaging the hanger portion with an upper edge of the wall panel;
   wherein the hanger portions each comprises a hook; and
   wherein the hook comprises a horizontal portion perpendicular to the suspension portion and a vertical portion secured to the horizontal portion and extending downwardly therefrom, the method further comprising positioning an upper edge of the wall panel between the vertical portion and the suspension portion.

2. The method of claim 1, wherein:
   the suspension portion includes a front portion and a rear portion defining a gap therebetween, the front portion defining a first outwardly facing recess and the rear portion defines a second outwardly facing recess;
   the aperture defined by the suspension portion extends through the front and rear portions; and
   engaging the second snap fastener portion of the snap fastener effective to capture the protective sheet and suspension portion of the hanger between the first and second snap fastener portions further comprises engaging the second snap fastener portion effective to capture the protective sheet in the gap between the front and rear portions having the snap fastener extending through both of the front and rear portions and having a first head of the first snap fastener portion positioned in the first outwardly facing recess and not protruding outwardly from the first outwardly facing recess and a second head of the second snap fastener portion positioned in the second outwardly facing recess and not protruding outwardly from the second outwardly facing recess.

3. The method of claim 1, wherein the first snap fastener portion and the second snap fastener portion each comprise a portion of a plastic rivet.

4. The method of claim 1, wherein the first snap fastener portion and the second snap fastener portion each comprise a head such that the suspension portion of the hanger is captured between the head of the first snap fastener portion and the head of the second snap fastener portion.

5. The method of claim 1, wherein engaging the second snap fastener portion is performed by hand without tools.

6. The method of claim 1, wherein the snap fastener is a first snap fastener and the hanger is a first hanger, the method further comprising:
   inserting a first snap fastener portion of a second snap fastener through a second hole of the plurality of holes and the aperture of the suspension portion of a second hanger of the plurality of hangers; and engaging a second snap fastener portion of the second snap fastener effective to capture the protective sheet and suspension portion of the second hanger.

7. The method of claim 1, wherein one of the first and second snap fastener portions includes at least one circumferential barb and the other of the first and second snap fastener portions includes at least one internal circumferential groove positioned to selectively engage the at least one circumferential barb and hinder removal thereof.

\* \* \* \* \*